United States Patent
Huang et al.

(10) Patent No.: US 10,114,473 B2
(45) Date of Patent: Oct. 30, 2018

(54) INTERACTIVE SYSTEM AND REMOTE DEVICE

(71) Applicant: PixArt Imaging Inc, Hsin-chu County (TW)

(72) Inventors: Chi-Yang Huang, Hsin-chu (TW);
Chia-Cheun Liang, Hsin-chu (TW);
Chao-Chien Huang, Hsin-chu (TW);
Han-Ping Cheng, Hsin-chu (TW);
Ming-Tsan Kao, Hsin-chu (TW)

(73) Assignee: PIXART IMAGING INC, Hsin-Chu County (TW)

( * ) Notice: Subject to any disclaimer, the term of this patent is extended or adjusted under 35 U.S.C. 154(b) by 549 days.

(21) Appl. No.: 13/926,337

(22) Filed: Jun. 25, 2013

(65) Prior Publication Data
US 2014/0043233 A1    Feb. 13, 2014

(30) Foreign Application Priority Data

Aug. 9, 2012  (TW) .............................. 101128890 A
Nov. 7, 2012  (TW) .............................. 101141255 A

(51) Int. Cl.
*G06F 3/03* (2006.01)
*G06F 3/0354* (2013.01)

(52) U.S. Cl.
CPC .......... *G06F 3/0304* (2013.01); *G06F 3/0325* (2013.01); *G06F 3/03542* (2013.01)

(58) Field of Classification Search
CPC .... G06F 3/0325; G06F 3/0346; G06F 3/0304; G06F 3/03542
USPC ................................................. 345/156–158
See application file for complete search history.

(56) References Cited

U.S. PATENT DOCUMENTS

| | | | | |
|---|---|---|---|---|
| 2002/0038334 A1* | 3/2002 | Schneider | ............... | G06F 3/023 709/203 |
| 2006/0152489 A1* | 7/2006 | Sweetser | ............... | G06F 3/0325 345/158 |
| 2006/0258465 A1* | 11/2006 | Lin | ......................... | A63F 13/04 463/49 |
| 2008/0170033 A1* | 7/2008 | Schultz | ................. | G06F 3/0321 345/157 |
| 2010/0229128 A1* | 9/2010 | Takahashi | ............... | G06F 3/017 715/858 |
| 2010/0309121 A1* | 12/2010 | Huang | .................. | G06F 3/0354 345/157 |
| 2011/0169734 A1* | 7/2011 | Cho | ...................... | G06F 3/0346 345/157 |

(Continued)

FOREIGN PATENT DOCUMENTS

| | | |
|---|---|---|
| CN | 101128794 A | 2/2008 |
| CN | 201773374 U | 3/2011 |
| TW | I281623 B | 5/2007 |

*Primary Examiner* — Jose Soto Lopez
(74) *Attorney, Agent, or Firm* — Hauptman Ham, LLP

(57) ABSTRACT

An interactive system includes a display, a processor and a remote controller. The display includes at least one reference beacon for providing light with a predetermined feature. The remote controller includes an image sensor configured to capture an image containing the reference beacon and calculates an aiming coordinate according to an imaging position of the reference beacon in the captured image. The processor calculates a scale ratio of a pixel size of the display with respect to that of the image captured by the image sensor and moves a cursor position according to the scale ratio and the aiming coordinate.

14 Claims, 13 Drawing Sheets

(56) References Cited

U.S. PATENT DOCUMENTS

2012/0194427 A1* 8/2012 Lee ................ G06F 3/0346
  345/157

* cited by examiner

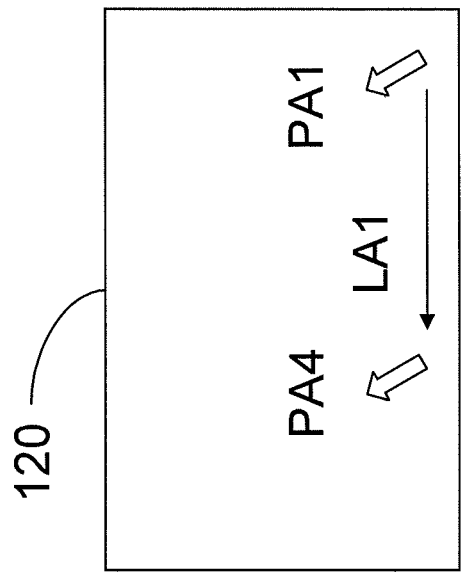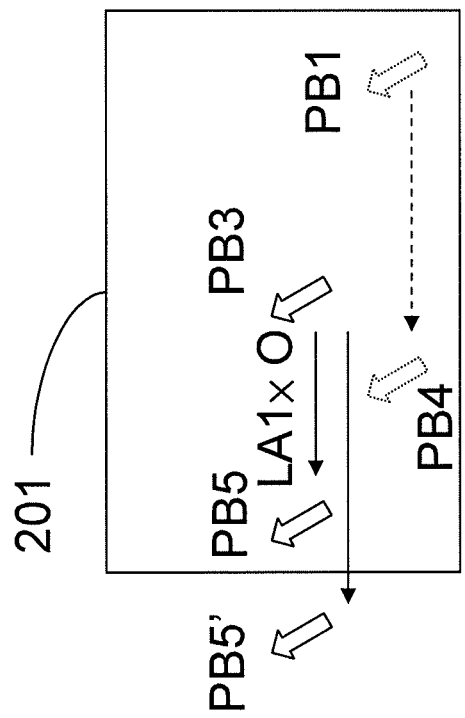
FIG. 4

INTERACTIVE SYSTEM AND REMOTE DEVICE

CROSS REFERENCE TO RELATED APPLICATION

This application claims the priority benefit of Taiwan Patent Application Serial Number 101128890, filed on Aug. 9, 2012 and Taiwan Patent Application Serial Number 101141255, filed on Nov. 7, 2012, the full disclosures of which are incorporated herein by reference.

BACKGROUND

1. Field of the Disclosure

This disclosure generally relates to an optical pointing system and remote controller thereof and, more particularly, to a coordinate transformation method capable of transforming the obtained absolute coordinate to a relative coordinate.

2. Description of the Related Art

The pointing system has been widely applied to the operation interface of televisions and computers. The pointing system is implemented using a remote controller in cooperation with an image sensor, wherein the image sensor is configured to capture images including a display and the remote controller is configured to calculate an aiming coordinate according to the captured images. The pointing system provides the aiming coordinate to a television or a computer to be served as the cursor control command or other control commands.

The remote controller can identify whether there is any object in the captured images representing the display according to an object shape and further calculate the corresponding coordinate of the object. Or reference light sources can be disposed on the display such that the remote controller can identify whether there is any object in the captured images representing the reference light sources according to the optical feature thereof, e.g. the object shape, object color and brightness and further calculate the corresponding coordinate of the object.

SUMMARY

The present disclosure provides an interactive system capable of performing the reset calibration and the operation calibration on the cursor position so that the cursor may be mapped to an aiming coordinate correctly.

The present disclosure further provides a remote device capable of outputting the calibrated and scaled relative displacement.

The present disclosure is related to an interactive system including a display, a processor and a remote controller. The display includes two reference beacons to respectively provide light with a predetermined feature. The remote controller includes an image sensor for capturing an image containing the reference beacons and is configured to calculate an aiming coordinate according to imaging positions of the reference beacons in the captured image. The processor calculates a scale ratio of a pixel size of the display with respect to that of the image captured by the image sensor and moves a cursor position according to the scale ratio and the aiming coordinate.

The present disclosure provides an interactive system including at least one reference beacon, a remote controller, a dongle and a display. The remote controller is configured to capture an image containing the reference beacon and calculate an aiming coordinate according to an imaging position of the reference beacon in the image. The dongle is configured to calculate a displacement according to the aiming coordinate and perform a reset calibration mode in which the dongle outputs a reset displacement according to an image resolution of the image and then outputs a calibration displacement according to the aiming coordinate. The display is configured to show a screen and a cursor, wherein the cursor is moved on the screen according to the displacement, the reset displacement and the calibration displacement.

The present disclosure further provides a remote device including a remote controller and a dongle. The remote controller is configured to capture an image containing at least one reference beacon and to accordingly output an aiming coordinate. The dongle includes a memory unit storing a scale parameter and a predetermined reset displacement, and is configured to output an adjusted displacement according to the aiming coordinate and the scale parameter and to perform a reset calibration mode in which the dongle outputs the predetermined reset displacement multiplied by the scale parameter and then outputs a calibration displacement multiplied by the scale parameter according to the aiming coordinate.

The present disclosure further provides an interactive system including at least one reference beacon, a remote controller, a display and a dongle. The remote controller is configured to capture an image containing the reference beacon and calculate an aiming coordinate according to an imaging position of the reference beacon in the image. The display is configured to show a screen and a cursor. The dongle is configured to perform an operation calibration mode when the aiming coordinate is at a boundary of the image so as to move the cursor to a screen boundary of the screen associated with the boundary of the image.

In the interactive system of the present disclosure, when confirming the aiming coordinate is at a boundary of the image, the dongle further outputs a compensation displacement so as to move the cursor to a screen boundary of the screen associated with the boundary of the image.

In the interactive system and the remote device of the present disclosure, the dongle or a set top box further performs a scaling according to a scale parameter, wherein the scale parameter may be a scale ratio of an image resolution of the image with respect to a screen resolution of the screen.

BRIEF DESCRIPTION OF THE DRAWINGS

Other objects, advantages, and novel features of the present disclosure will become more apparent from the following detailed description when taken in conjunction with the accompanying drawings.

FIG. 4 shows a schematic diagram of the coordinate transformation in the relative displacement mode of the present disclosure.

DETAILED DESCRIPTION OF THE EMBODIMENT

Figure 1:
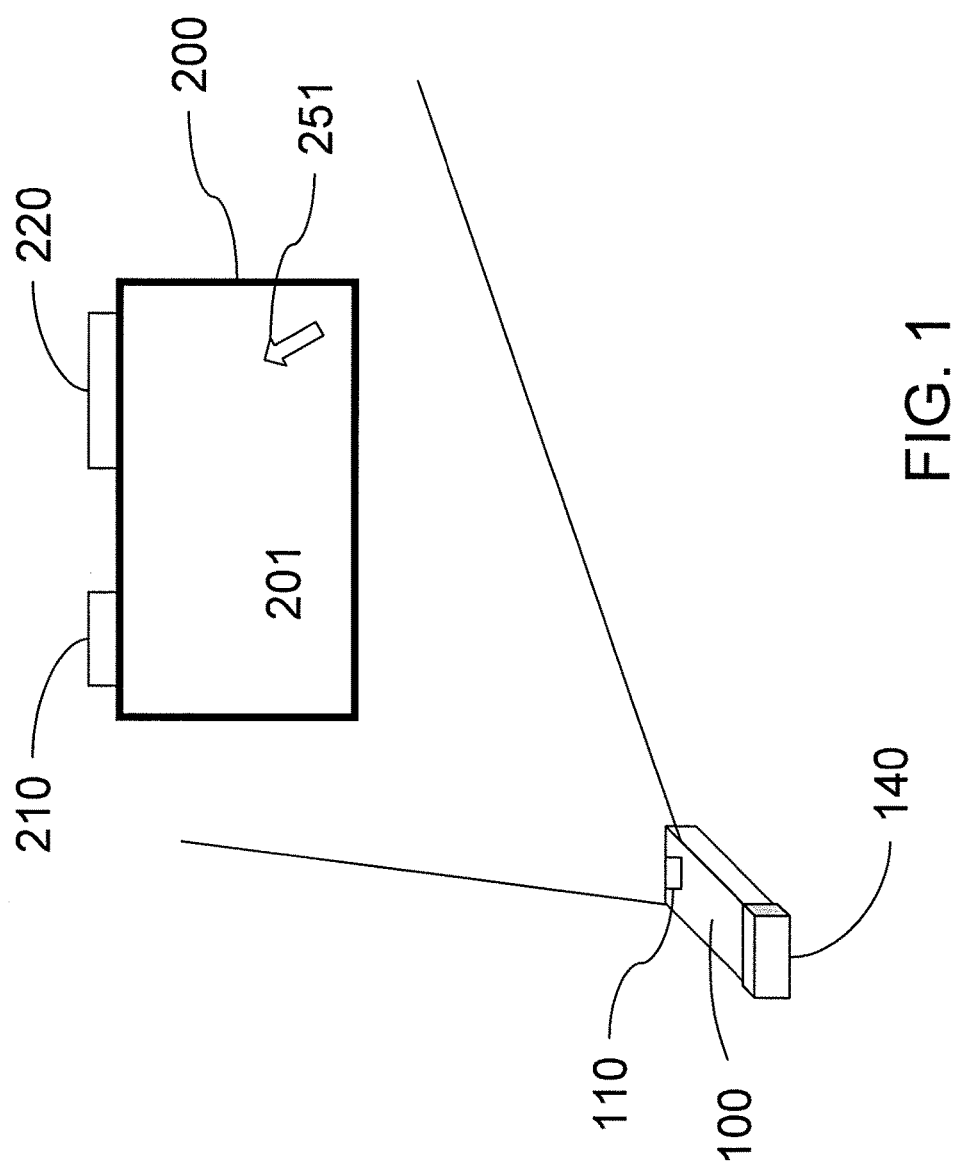
FIG. 1 shows a schematic system diagram of the present disclosure.

The above or other technical contents, characteristics and effects according to the present disclosure will become more apparent from the following detailed description of a preferred embodiment in conjunction with the accompanying drawings. It is to be understood that terms of direction used herein, such as upward, downward, leftward, rightward, forward and backward, are only used for reference but not used to limit the present disclosure. It should be noted that, wherever possible, the same reference numbers will be used throughout the drawings to refer to the same or like parts.

The present disclosure generally relates to an interactive system and, more particularly, to a pointing interactive system. The interactive system includes a remote controller 100 and a display 200. The display 200 shows a screen 201 and a cursor 251, and the remote controller 100 is configured to control the movement of the cursor 251 on the screen 201.

The display 200 may be a television or the display adapted to interactive game systems. The display 200 has two reference beacons 210 and 220 configured to provide light with a predetermined optical feature. For example, the two reference beacons 210 and 220 may provide light of a first frequency; or the reference beacon 210 provides light of a second frequency and the reference beacon 220 provides light of a third frequency. Preferably the reference beacons 210 and 220 are infrared light sources so as to distinguish from ambient light.

Figure 2:
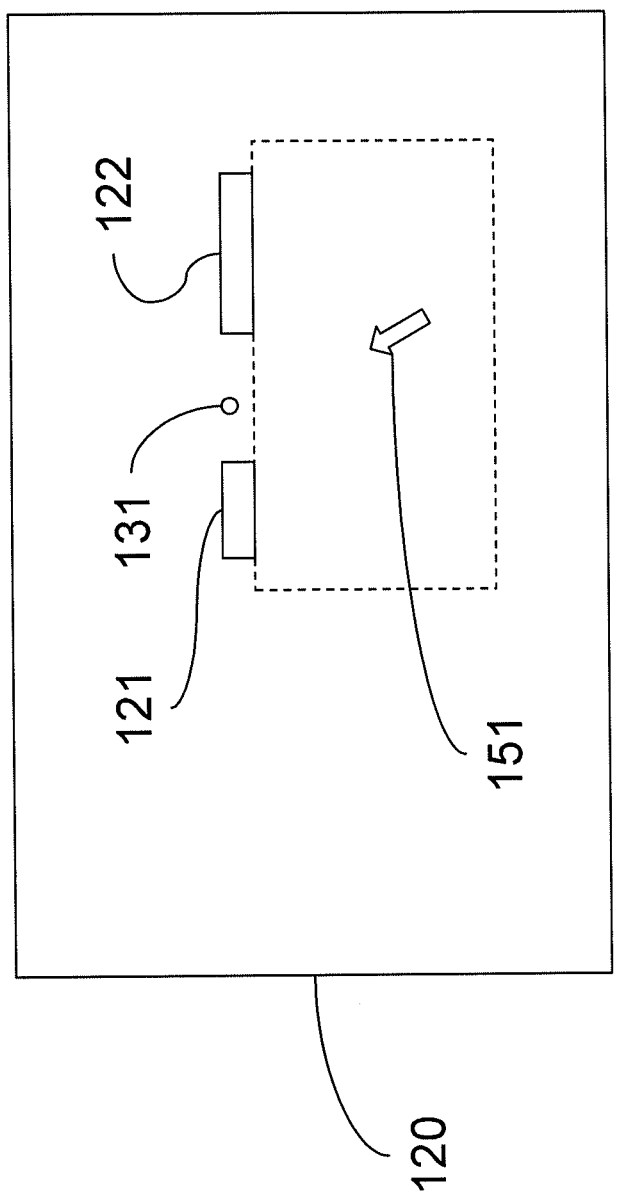
FIG. 2 shows a schematic diagram of the image captured by an image sensor of the present disclosure.

The remote controller 100 at least includes an image sensor 110, which is configured to capture images containing the reference beacons 210 and 220. FIG. 2 shows an image 120 captured by the image sensor 110. In one embodiment, the image sensor 110 may be an infrared image sensor and the reference beacons 210 and 20 may be infrared light sources, and thus the image 120 only contains reference beacon images 121 and 122 of the reference beacons 210 and 220 and does not contain other parts of the display 200. It is appreciated that a number of the reference beacons is determined according to the algorithm for calculating an aiming coordinate in the image 120 captured by the image sensor 110 as long as the system includes at least one reference beacon.

The interactive system may further include a processor 140, which may receive a control signal outputted by the remote controller 100 and control the cursor 251 on the screen 201 shown by the display 200 according to the control signal. Although FIG. 1 shows that the processor 140 is integrated with the remote controller 100, this arrangement is only exemplary and not to limit the present disclosure. For example, if the display 200 is a television, the processor 140 may also be integrated with the display 200; or if the display 200 is an interactive game display, the processor 140 may be integrated with an external device (e.g. a game host) and wired or wirelessly connected to the remote controller 100 and the display 200.

The processor 140 may generate a reference coordinate 131 according to imaging positions of the reference beacon images 121 and 122 in the image 120, and the reference coordinate 131 may be a center of the imaging positions of the reference beacon images 121 and 122. In other embodiments, when only one reference beacon is employed, the reference coordinate 131 may be an imaging position of the reference beacon image. The processor 140 may further generate an aiming coordinate 151. The processor 140 may generate the aiming coordinate 151 according to a hardware parameter of the display 200, which is already known, and the reference coordinate 131, wherein the hardware parameter may include a pixel size of the display 200 and positions of the reference beacons 210 and 220 with respect to the display 200. Accordingly, the processor 140 may calculate the aiming coordinate 151 of the remote controller 100 pointing at the display 200 according to a position of the reference coordinate 131 in the image 120.

When the remote controller 100 is aimed at an aiming point on the screen 201, an optical axis of the image sensor 110 is aimed at the aiming point; i.e. the aiming point is at a center of the image captured by the image sensor 110. Therefore, the processor 140 may obtain the aiming coordinate 151 according to a position relationship of the reference coordinate 131 with respect to the center of the image 120 as well as the hardware parameter of the display 200, wherein the aiming coordinate 151 is corresponded to the coordinate of the aiming point on the display 200.

The method of detecting the imaging position of the reference beacon using an image sensor and then calculating the aiming coordinate is well known to the art and thus details thereof are not described herein.

Figure 3:
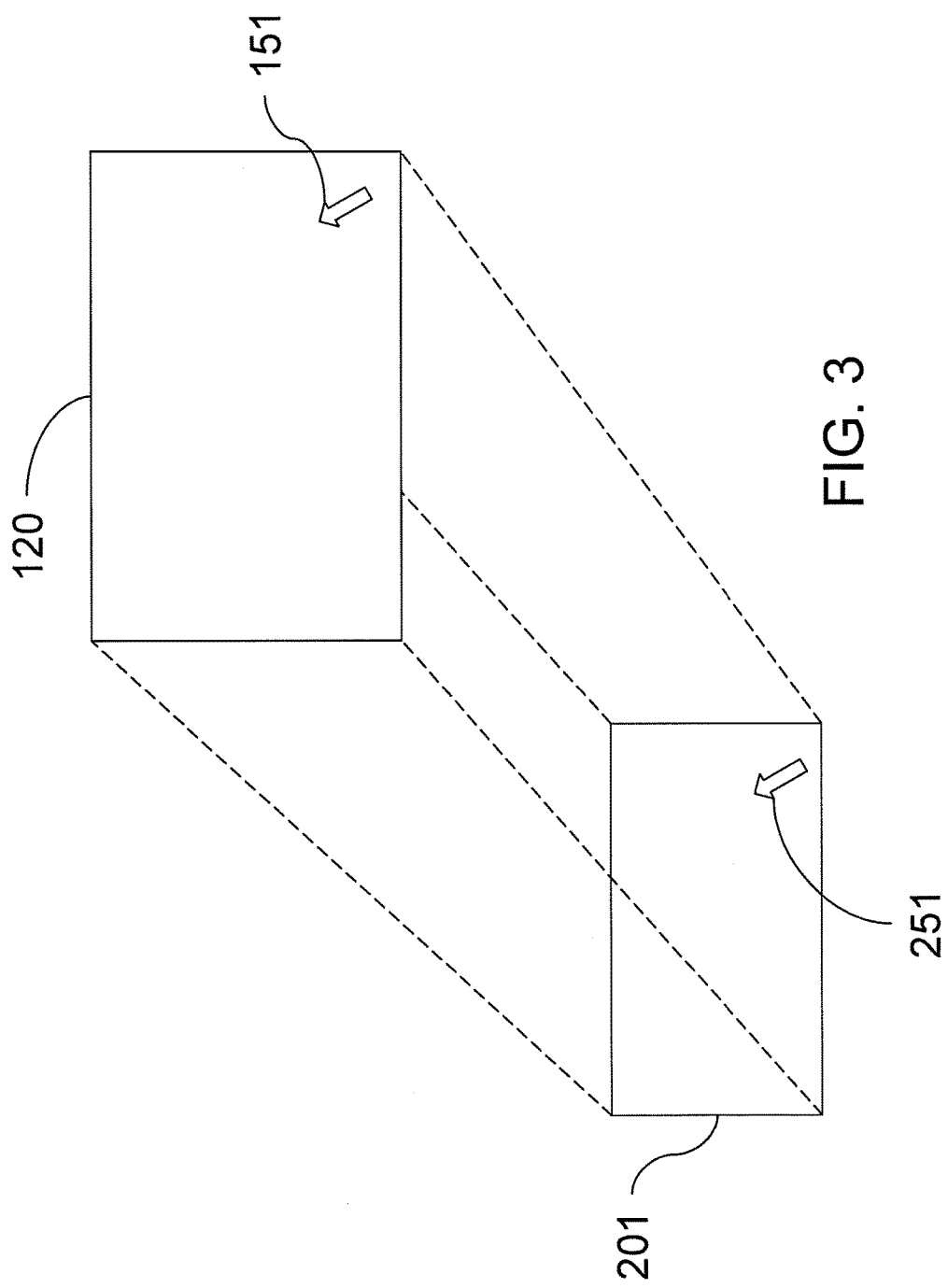
FIG. 3 shows a schematic diagram of the mapping between the captured image and the displayed screen in the present disclosure.

Referring to FIG. 3, the aiming coordinate 151 in the image 120 is configured to be mapped to a position of the cursor 251 on the screen 201 shown by the display 200, wherein as a pixel size of the display 200 may not be consistent with that of the image 120, the aiming coordinate 151 has to be multiplied by a scale parameter so as to map the aiming coordinate 151 to the position of the cursor 251 on the screen 201 shown by the display 200.

For example, in the embodiment below it is assumed that the pixel size of the image 120 is 1920×1080 (i.e. the image resolution) and the pixel size of the screen 201 shown by the display 200 is 720×480 (i.e. the screen resolution). When the processor 140 calculates that the aiming coordinate 151 is PA1(X1, Y1), the position PB1(M1, N1) of the cursor 251 on the display 200 mapped from the aiming coordinate 151 may be calculated by equations:

$$M1 = X1 \times 720/1920;$$

$$N1 = Y1 \times 480/1080;$$

that is, $PB1 = PA1 \times O\ (720/1920,\ 480/1080)$, wherein the parameter (720/1920, 480/1080) is the scale parameter O configured to transform a coordinate of the image 120 to the screen 201 shown by the display 200. Accordingly, the processor 140 may output an absolute coordinate of the aiming point of the remote controller 100.

In another embodiment, the remote controller 100 may also be operated in a relative displacement mode in which the obtained absolute coordinate is transformed to a relative displacement such that the remote controller 100 of the present disclosure may simulate the operation of a mouse. When the image sensor 110 respectively captures an image at successive times t1 and t2, two aiming coordinates 151 may be obtained as PA1(X1, Y1) and PA2(X2, Y2) respectively. If the cursor 251 on the display 200 is at PB1(M1, N1) at time t1, the position PB2(M2, N2) of the cursor 251 at time t2 may be obtained according to equations:

$$M2=M1+dM; dM=dX\times720/1920; dX=X2-X1;$$

$$N2=N1+dN; dN=dY\times480/1080; dY=Y2-Y1;$$

that is, $PB2=PB1+dPB=PB1+(PA2-PA1)\times O$.

The display 200 may receive a relative displacement parameter dPB(dM, dN) to accordingly move the cursor 251 from the position PB1(M1, N1) to the position PB2(M2, N2).

In one embodiment, when the interactive system is applied to an interactive game, the processor 140 is integrated with the remote controller 100 and the remote controller 100 may wired or wirelessly transmit a remote signal to a dongle of a game host. The game host then generates a control signal according to the remote signal provided by the remote controller 100 to accordingly control the cursor 251 on the display 200.

However, errors may occur in the process of transforming the absolute coordinate of the aiming coordinate 151 obtained by the remote controller 100 to the relative displacement. The error may occur because of using incorrect scale parameter O between the pixel size of the image 120 captured by the remote controller 100 and that of the screen 201 shown by the display 200. Or an initial aiming coordinate 151 of the remote controller 100 is not correctly mapped to an initial position of the cursor 251 on the display 200.

Referring to FIG. 4, it shows another embodiment of the present disclosure in which the remote controller 100 is not aimed at an initial position PB3 of the cursor 251 on the screen 201. Now the aiming coordinate 151 of the image 120 captured by the remote controller 100 is at an initial position PA1, which is mapped to a position PB1 of the screen 201 rather than the position PB3; that is, PB3 is not equal to PA1×O. Therefore, if the relative displacement of the aiming coordinate 151 is directly multiplied by the scale parameter O(720/1920, 480/1080) and then provided to the display 200, the display 200 may not be able to correctly show the coordinate of the aiming coordinate 151 mapping to the screen 201.

Referring to FIG. 4, as the initial position of the cursor 251 on the screen 201 is PB3 and the initial position of the aiming coordinate 151 in the image 120 is PA1, when the remote controller 100 is operated to move the aiming coordinate 151 leftward by a pixel distance LA1, the cursor 251 on the screen 201 is also moved leftward by a pixel distance LA1×O. However, a position PA4 of the aiming coordinate 151 after moving is not mapped to a position PB5 of the cursor 251 after moving and thus the user is not able to correctly move the cursor 251 to the position PB4 on the screen 201, which is mapped to the position PA4 in the image 120. Moreover, if the remote controller 100 is moved farther, a position PB5' of the cursor 251 after moving may exceed a range of the screen 201.

In one embodiment of the present disclosure, when the remote controller 100 is operated in the relative displacement mode, a reset calibration mode may be performed every time in the start of operation so as to move the cursor 251 on the screen 201 to an origin of the screen 201 at first and then move the cursor 251 to the correct position on the screen 201 by providing an initial coordinate of the aiming coordinate 151 as a relative displacement to the display 200.

Figure 5:
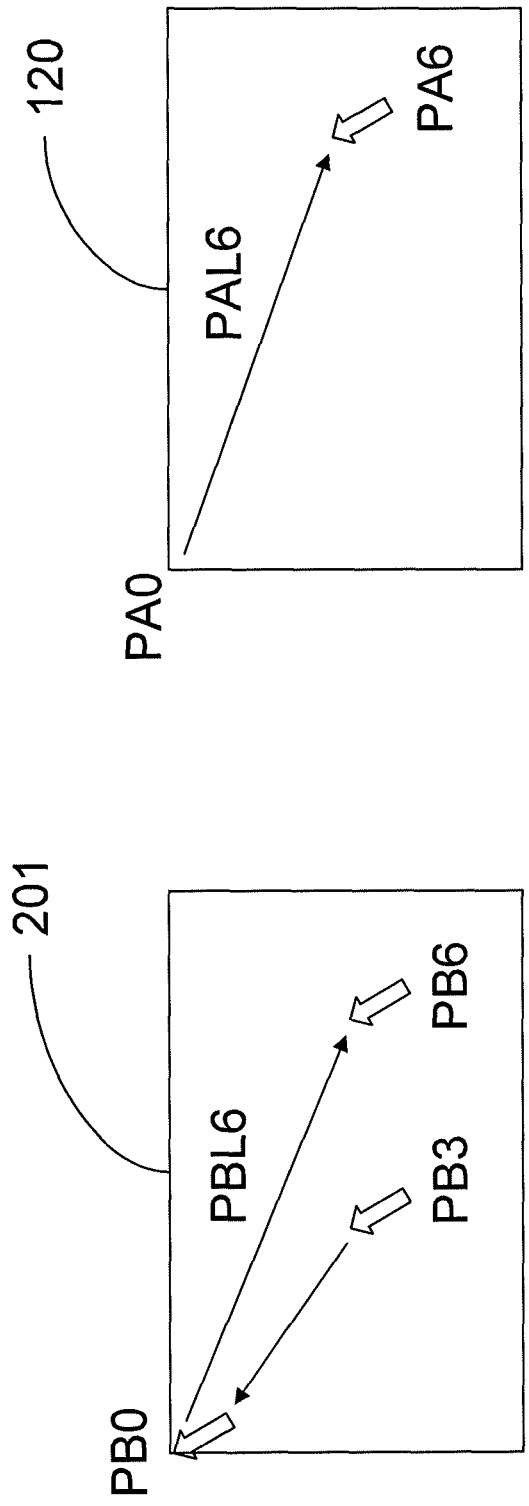
FIG. 5 shows a schematic diagram of tracking the aiming point by the cursor in the relative displacement mode of the present disclosure.

Referring to FIG. 5 in which an initial position of the cursor 251 on the screen 201 is PB3 and an initial aiming position of the aiming coordinate 151 of the remote controller 100 is at PA6. Now as the remote controller 100 is not aimed at the initial position PB3 of the cursor 251, PB3 is not equal to PA6×O. It is not proper to calculate the relative displacement of the cursor 251 on the screen 201 directly according to the relative displacement of the aiming coordinate 151.

Therefore, the position of the cursor 251 is moved from PB3 to the origin PB0 of the screen 201 and it is able to obtain a relative distance PAL6 between the initial coordinate position PA6 of the aiming coordinate 151 and the origin PA0 of the image 120. Then the relative distance PBL6 between the position PB6 of the screen 201, which is mapped from the position PA6 of the image 120, and the origin PB0 of the screen 201 may be calculated according to the relative distance PAL6 and then the cursor 251 is moved from the origin PB0 to the position PB6 according to the relative distance PBL6.

The method of moving the cursor 251 from the initial position PB3(M3, N3) to the origin PB0(0, 0) may be performed by providing a moving distance exceeding the pixel size of the screen 201 from the remote controller 100 (or the dongle). In this manner, the cursor 251 may be moved back to the origin PB0. As the maximum value of M3 in the X-axis is 719, (M3–720) is smaller than 0 so that a new X-coordinate will be 0. As the maximum value of N3 in the Y-axis is 479, (N3–480) is smaller than 0 so that a new Y-coordinate will be 0. Accordingly, the initial coordinate PB3 of the cursor 251 may be subtracted by (720, 480) so as to move the cursor 251 to the origin PB0 of the screen 201.

Next, the relative distance PAL6 between the initial position PA6 of the aiming coordinate 151 and the origin PA0 of the image 120 is calculated, and the relative distance PBL6 between the position PB6 and the origin PB0 of the screen 201 can be calculated by referring the scale parameter O. Then the cursor 251 is moved from the origin PB0 by the relative distance PBL6 to the position PB6 so that the cursor 251 is moved to the position aimed by the remote controller 100.

In the above embodiment, the cursor 251 may also be moved to one selected corner of four corners of the screen 201 and then moved to the position PB6 from the selected corner according to a relative distance between the aiming coordinate 151 and the corner of the image 120 associated with the selected corner of the screen 201.

The method of moving the cursor 251 to any selected corner is identical to moving the cursor 251 to the origin PB0. For example, if it is to move the cursor 251 to the top-right corner, an X-coordinate of the current position PB3 of the cursor 251 may be added by a value larger than an X-scale of the screen resolution (i.e. pixel size) of the screen 201, e.g. M3+720; and a Y-coordinate of the current position PB3 of the cursor 251 may be subtracted by a value larger than a Y-scale of the screen resolution of the screen 201, e.g. N3−480. As (M3+720) is larger than 719, the X-coordinate of the cursor 251 is updated to 719; and as (N3−480) is smaller than 0, the Y-coordinate of the cursor 251 is updated to 0 so that the cursor 251 is moved to the position (719, 0). In other words, the cursor 251 may be moved to a corner of the screen 201 according to an image resolution of the image 120 or a screen resolution of the screen 201 at first, and then moved to a correct position according to an initial coordinate of the aiming coordinate 151. The image resolution may be transformed to and from the screen resolution according to the scale parameter.

Figure 6:
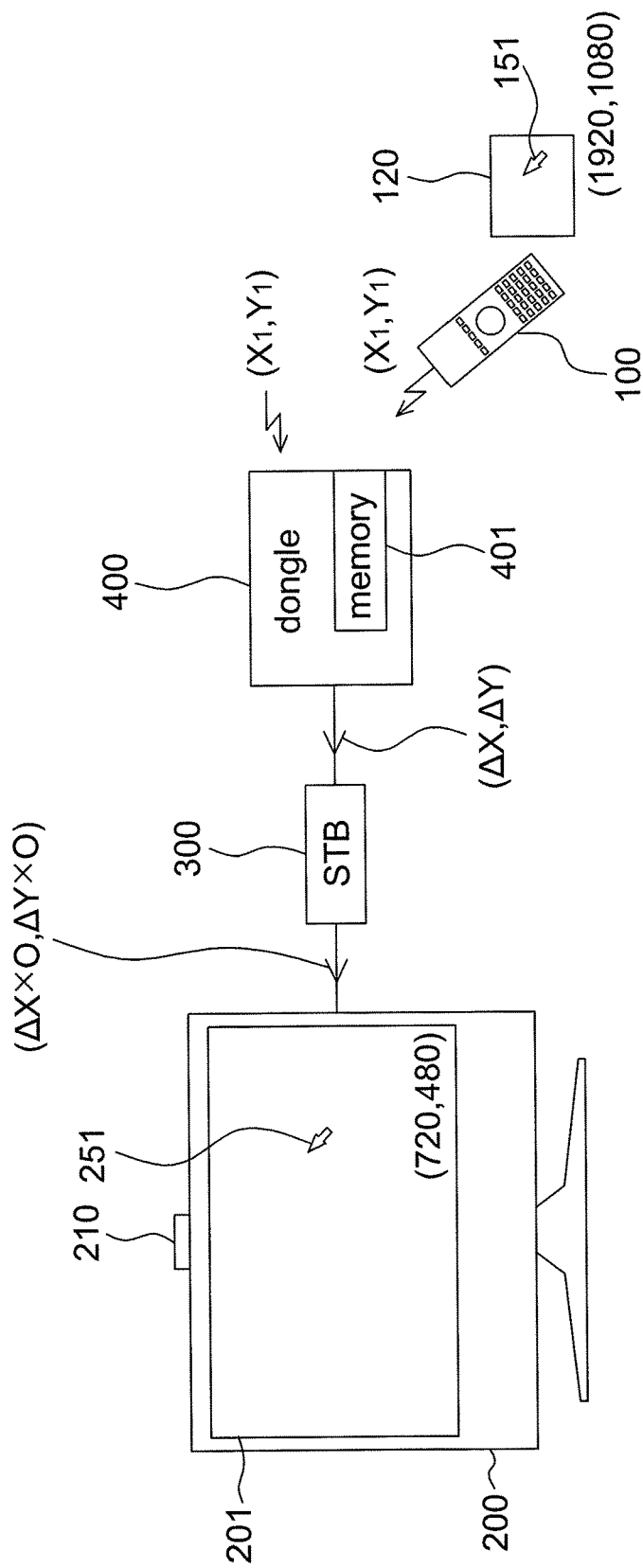
FIG. 6 shows a schematic diagram of the interactive system according to an embodiment of the present disclosure.

Referring to FIG. 6, the interactive system according to the embodiment of the present disclosure includes a remote controller 100, a display 200, at least one reference beacon 210, a set top box (STB) 300 and a dongle 400, wherein the dongle 400 herein is shown to be wirelessly connected to the remote controller 100 and electrically connected to the display 200. However, the connection and the space relationship between the dongle 400 and the remote controller 100 as well as the display 200 may be arranged according to different applications.

The remote controller 100 is configured to output an aiming coordinate (i.e. the absolute coordinate), wherein the method of calculating an aiming coordinate (X1, Y1) may use the calculation of FIG. 2 and its corresponding descriptions, e.g. according to an imaging position of the reference beacon 210 in the image 120. The dongle 400 calculates and outputs a displacement (i.e. the relative displacement) to the STB 300 according to the aiming coordinate. For example, a transverse displacement ΔX=X1−X0 and a longitudinal displacement ΔY=Y1−Y0 may be obtained, wherein (X0, Y0) is the aiming coordinate obtained in a sampling period previous to (X1, Y1). The STB 300 may output an adjusted displacement (ΔX×O, ΔY×O) according to the displacement (ΔX, ΔY) and the scale parameter O so as to control the motion of the cursor 251 on the display 200, wherein the method of the STB 300 controlling the cursor 251 on the display 200 according to the adjusted displacement (ΔX×O, ΔY×O) is well known and thus details thereof are not described herein. The present disclosure is to allow the dongle 400 to correctly calculate the relative displacement of the cursor 251 according to the absolute coordinate outputted by the remote controller 100 and to perform calibration when errors occur. In addition, the remote controller 100 may be any remote device capable of outputting the aiming coordinate without any limitation. As mentioned above, the aiming coordinate may be calculated by the processor 140 of the remote controller 100.

The dongle 400 according to the embodiment of the present disclosure may perform a reset calibration mode and an operation calibration mode, wherein the reset calibration mode may be performed when the remote controller 100 has detected the reference beacon 210 or receives a reset signal (e.g. a reset button is pressed by a user) or automatically performed every predetermined time interval according to different applications. The operation calibration mode may be automatically performed when a user is using the remote controller 100 to control the cursor 251 (described later).

Referring to FIG. 5, as mentioned above when the user starts to use the remote controller 100, the initial position PB3 of the cursor 251 on the screen 201 may not be correctly mapped to the initial aiming position PA6 of the aiming coordinate 151 of the remote controller 100. The dongle 400 preferably performs the reset calibration mode at the moment.

Figure 7:
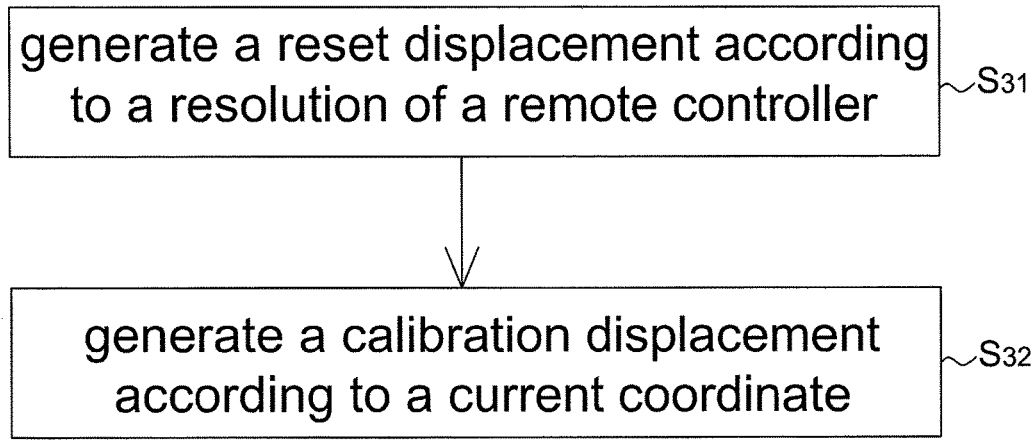
FIG. 7 shows an operational flow chart of the reset calibration mode of the interactive system according to the embodiment of the present disclosure.

Referring to FIG. 7, it shows an operational flow chart of the reset calibration mode, which includes the steps of: generating a reset displacement according to a resolution of a remote controller (Step $S_{31}$); and generating a calibration displacement according to a current coordinate (Step $S_{32}$).

Step $S_{31}$: When the reset calibration mode is entered, no matter what the aiming coordinate (X1, Y1) generated by the remote controller 100 is, the dongle 400 directly outputs a reset displacement according to an image resolution (or a screen resolution of the screen 201) of the image 120 captured by the remote controller 10 at first. For example, if the image resolution is 1920×1080, the reset displacement may be (−1920, −1080), but not limited to. The STB 300 then adjusts the reset displacement with the scale parameter O so as to move the cursor 251 from the position PB3 to PB0 (as shown in FIG. 5). As mentioned above, in the reset calibration mode the cursor 251 may also be moved to other corners of the screen 201 according to the reset displacement.

Step $S_{32}$: Next, the dongle 400 outputs a calibration displacement (ΔX1, ΔY1) according to a current aiming coordinate (X1, Y1) received. For example, ΔX1=X1−0 and ΔY1=Y1−0. The STB 300 may adjust the calibration displacement (ΔX1, ΔY1) with the scale parameter O and then accordingly moves the cursor 251 from the position PB0 to PB6 (as shown in FIG. 5) such that the cursor 251 is mapped to the aiming coordinate 151 of the image 120. Therefore, the calibration displacement may be a relative distance between the aiming coordinate and an origin of the image, e.g. PAL6 shown in FIG. 5.

Then the dongle 400 normally calculates and outputs the displacement to the STB 300 according to the received aiming coordinates. The STB 300 adjusts the received displacement with the scale parameter O to accordingly control the cursor 251 on the display 200.

It is appreciated that the mismapping between the cursor 251 and the aiming coordinate 151 is not limited to that described above, and it may also occur due to, for example, loss frame during the operation of the dongle 400. In other words, as the reset calibration mode is configured to eliminate the mismapping between the cursor 251 and the aiming coordinate 151 in the embodiment of the present disclosure, the dongle may automatically perform or may be instructed to perform the reset calibration mode at any proper time.

Figure 8:
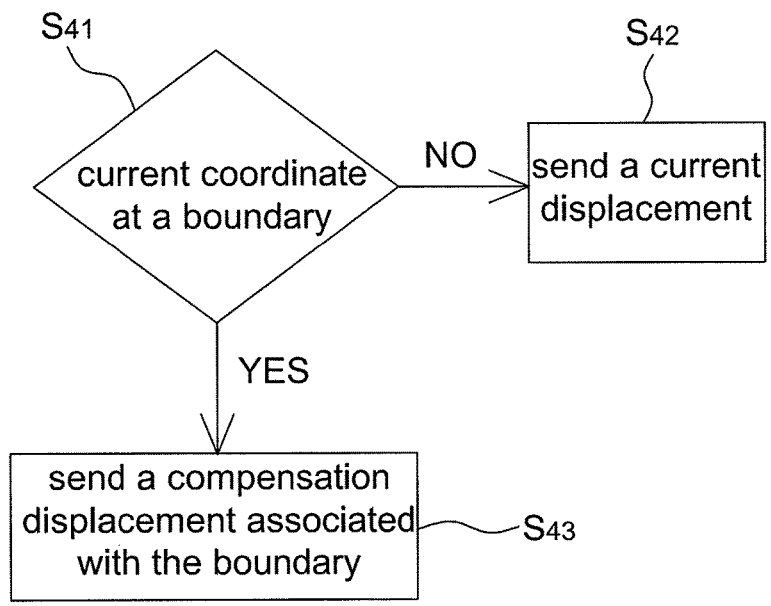
FIG. 8 shows an operational flow chart of the operation calibration mode of the interactive system according to the embodiment of the present disclosure.

Referring to FIG. 8, it shows an operational flow chart of the operation calibration mode. As mentioned above, the mismapping between the cursor 251 and the aiming coordinate 151 may still occur in normal operation because of loss frame or other reasons. Therefore in the present disclosure, besides the reset calibration mode, the dongle 400 may further automatically adjust the position of the cursor 251 in operating the cursor 251. The operation calibration mode of this embodiment includes the steps of: detecting whether a current coordinate is at a boundary (Step $S_{41}$); if not, generating a current displacement (Step $S_{42}$); if yes, generating a compensation displacement associated with the boundary (Step $S_{43}$).

Step $S_{41}$: In normal operation, the dongle 400 calculates and outputs the displacement (ΔX, ΔY) between the aiming coordinates to the STB 300 according to successive aiming coordinates sent from the remote controller 100; meanwhile, the dongle 400 further detects whether a current aiming coordinate 151 received is at any boundary of the image 120, e.g. detecting whether the coordinate X1 is equal to 1 or 1919 and detecting whether the coordinate Y1 is equal to 1 or 1079.

Step $S_{42}$: When the dongle 400 identifies that the current aiming coordinate 151 is not at the boundary of the image 120, the dongle 400 directly generates a current displacement (e.g. a displacement between a current aiming coordinate and a previous aiming coordinate obtained in a previous image) to the STB 300.

Step $S_{43}$: When the dongle 400 identifies that the aiming coordinate 151 is at a boundary of the image 120, the dongle 400 outputs an image resolution associated with the boundary to be served as a compensation displacement no matter what the position of the cursor 251 on the screen 201 is. For example referring to FIGS. 9A to 9D, they show operational schematic diagrams of the Steps $S_{41}$ and $S_{43}$ in this embodiment.

Figure 9B:
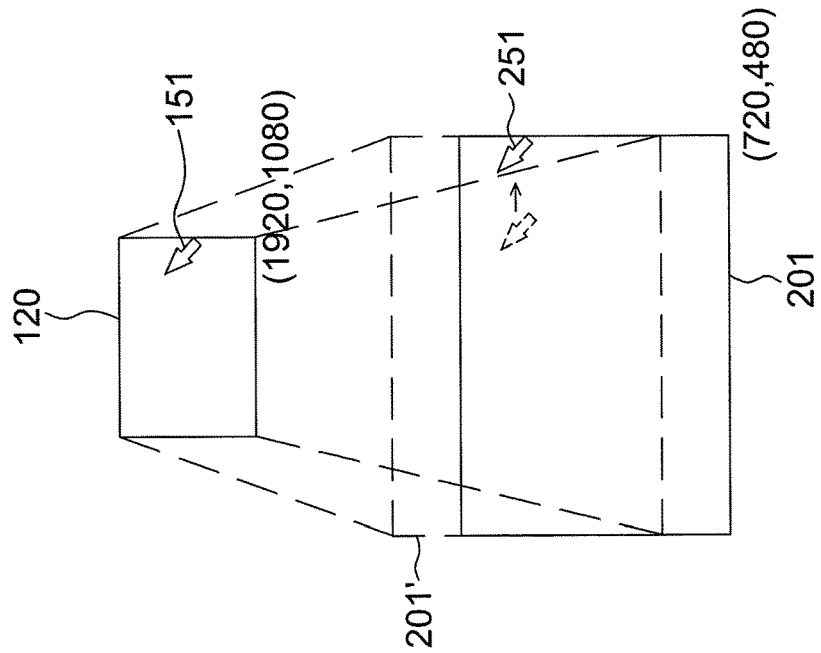
FIGS. 9A-9D show operational schematic diagrams of the operation calibration mode of the interactive system according to the embodiment of the present disclosure.
Figure 9A:
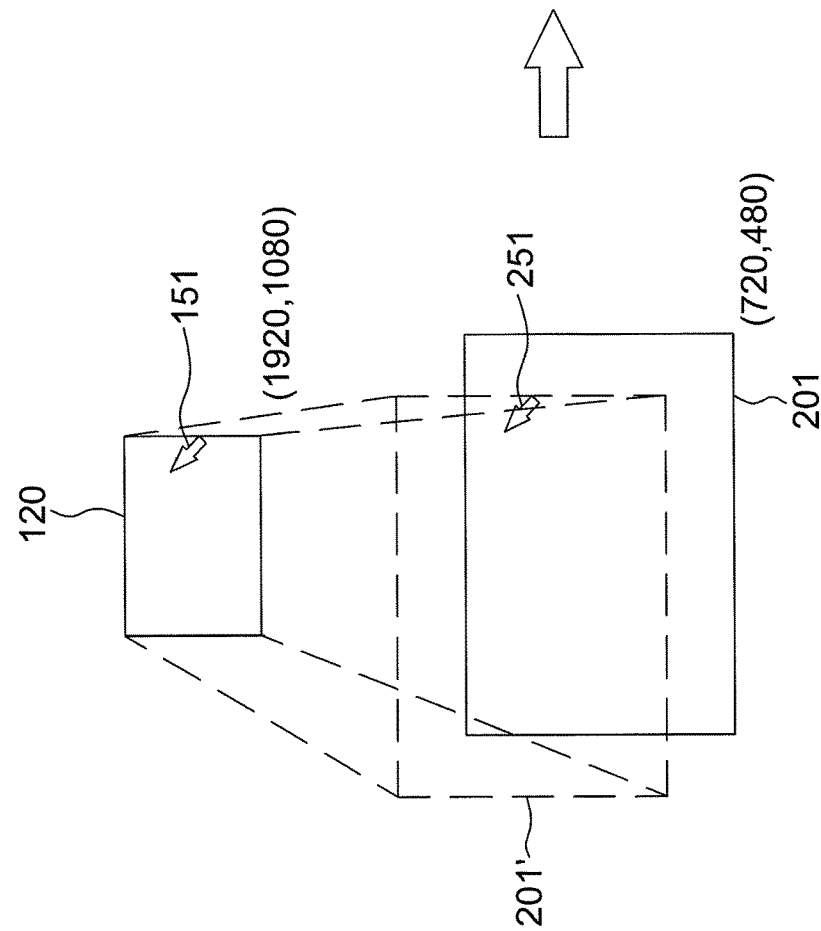

In FIG. 9A, for example when the cursor 251 and the aiming coordinate 151 is not mapping to each other, the screen mapped from the image 120 may change from 201 to 201'. This mismapping may lead to results that the user may not be able to use the remote controller 100 to control the cursor 251 moving on the whole screen 201, and thus a calibration needs to be performed by using the operation calibration mode. For example, now the dongle 400 detects that the aiming coordinate 151 is at a right boundary of the image 120 (e.g. the aiming coordinate X1=1919) and thus the process enters the step $S_{43}$.

In FIG. 9B, the dongle 400 generates a resolution associated with the right boundary to be served as a compensation displacement (e.g. ΔX=+1920). Accordingly, the cursor 251 is moved to a screen boundary of the screen 201 associated with the right boundary of the image 120 so as to allow the cursor 251 to be mapped to the aiming coordinate 151 in a transverse direction.

Figure 9D:
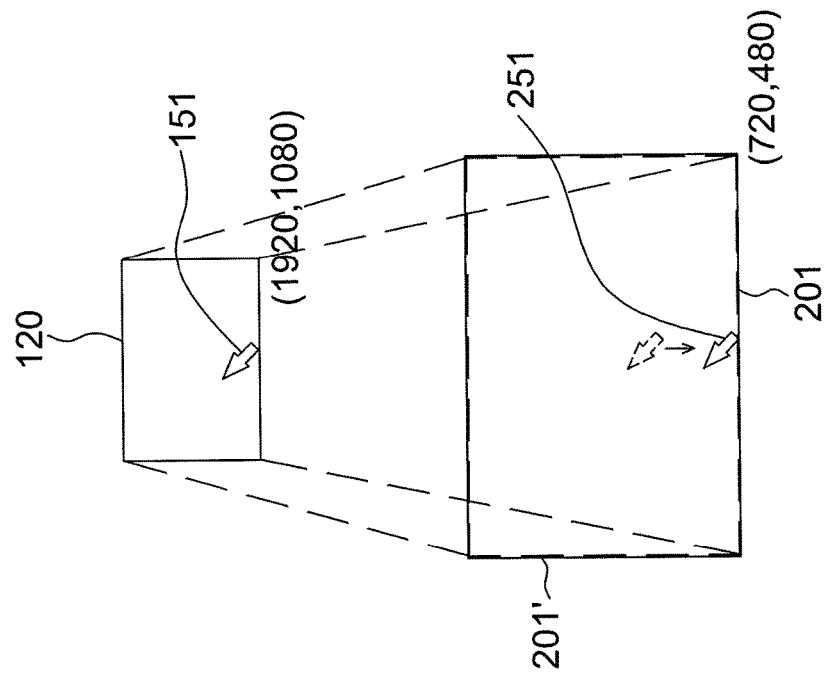
Figure 9C:
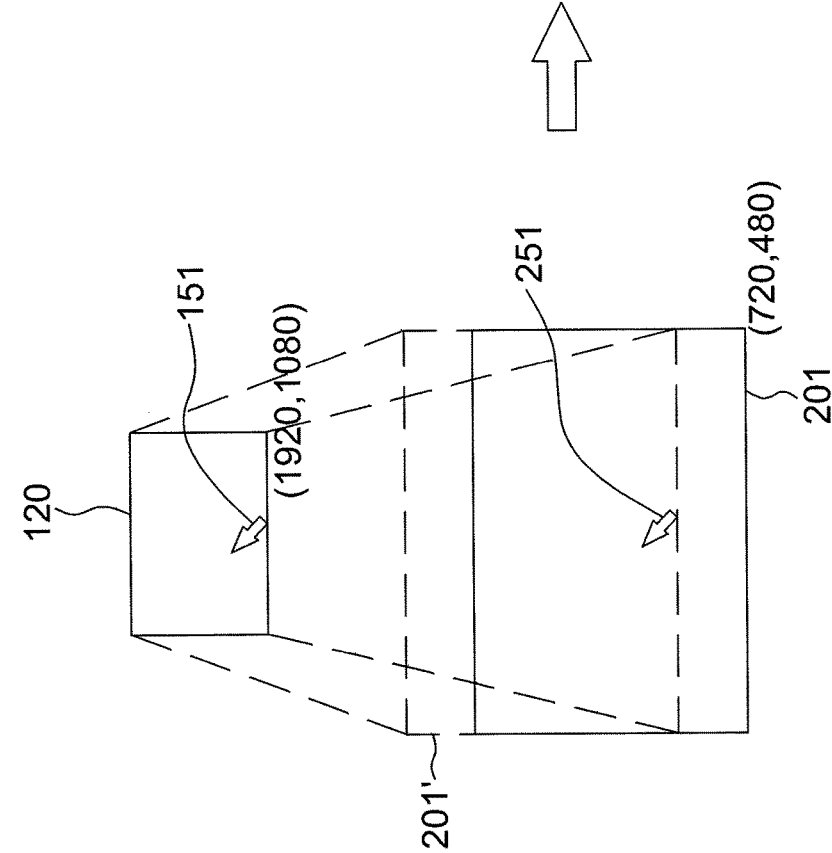

In FIG. 9C, the dongle 400 detects that the aiming coordinate 151 is at a lower boundary of the image 120 (e.g. the aiming coordinate Y1=1079) and thus the process enters the step $S_{43}$.

In FIG. 9D, the dongle 400 generates a resolution associated with the lower boundary to be served as a compensation displacement (e.g. ΔY=+1080). Accordingly, the cursor 251 is moved to a screen boundary of the screen 201 associated with the lower boundary of the image 120 so as to allow the cursor 251 to be mapped to the aiming coordinate 151 in a longitudinal direction.

It should be mentioned that the calibrations in the transverse direction and the longitudinal direction may not be performed successively, and they may be performed only when the aiming coordinate 151 appears at the boundary without following any specific sequence. For example, it is possible that the calibration is performed only in one of the transverse direction and the longitudinal direction within a time interval. In addition, when the operation calibration mode is enabled, as the normal operation is not affected even though the cursor 251 is already at the boundary of the screen 201, the operation calibration mode may be performed as long as the aiming coordinate 151 appears at any boundary.

In other embodiments, the STB 300 may not have the function of adjusting the movement of the cursor 251 according to the scale parameter O, and thus the dongle 400 may need to perform the scaling so as to correctly control the cursor 251. For example, the STB 300 may be a commercially available device and only configured to receive the relative displacement and to accordingly control the motion of the cursor 251 on the display 200. Therefore, the remote controller 100 and the dongle 400 may form a remote device configured to output a relative displacement to the STB 300, and the dongle 400 further performs the scaling on the obtained displacement according to the scale parameter O.

Figure 10:
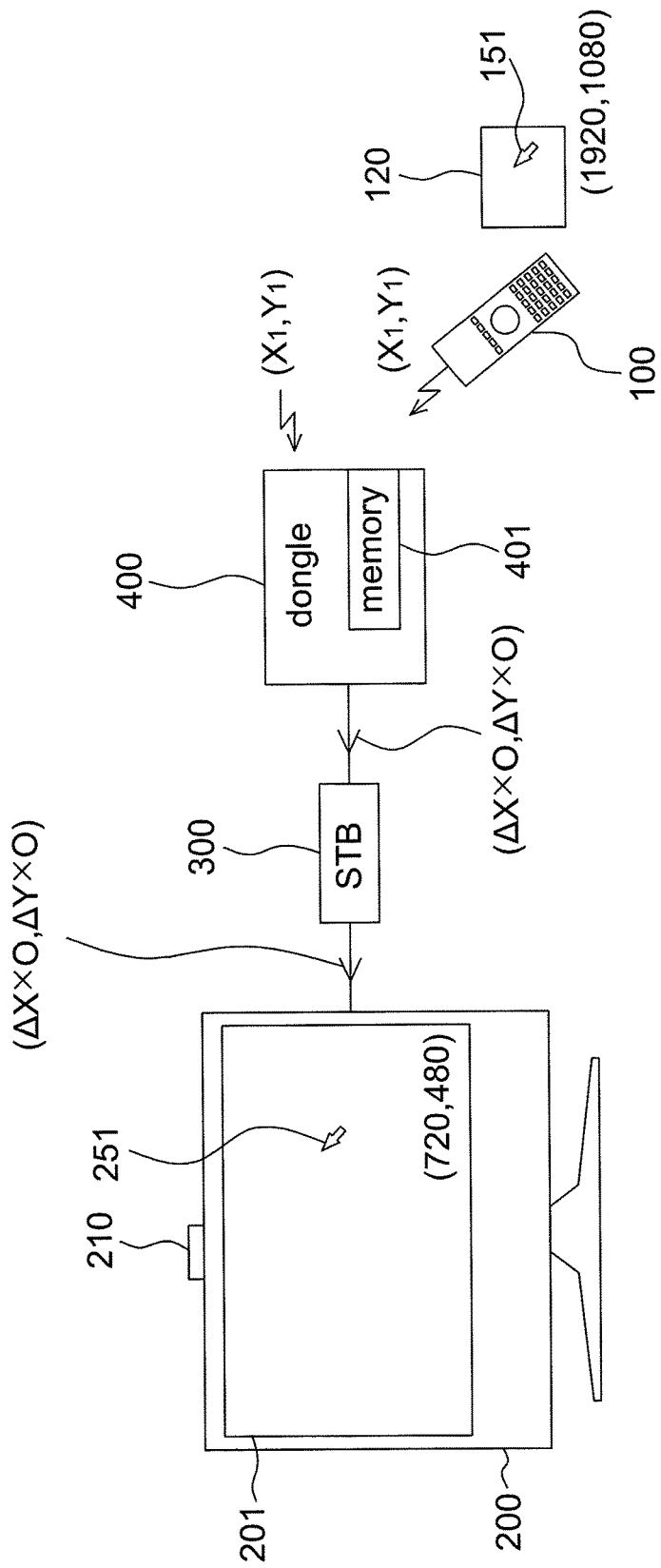
FIG. 10 shows a schematic diagram of the interactive system according to an alternative embodiment of the present disclosure.

For example referring to FIG. 10, the interactive system of this embodiment also includes a remote controller 100, a display 200, at least one reference beacon 201, a set top box (STB) 300 and a dongle 400. The difference of this embodiment from the previous embodiment is that in this embodiment the dongle calculates and outputs an adjusted displacement (ΔX×O, ΔY×O) to the STB 300 according to the aiming coordinate outputted by the remote controller 100 and the scale parameter O. The STB 300 directly controls the motion of the cursor 251 on the display 200 according to the adjusted displacement (ΔX×O, ΔY×O).

The dongle 400 of this embodiment is also able to perform a reset calibration mode and an operation calibration mode, wherein the scaling is performed in both calibration modes.

Figure 11:
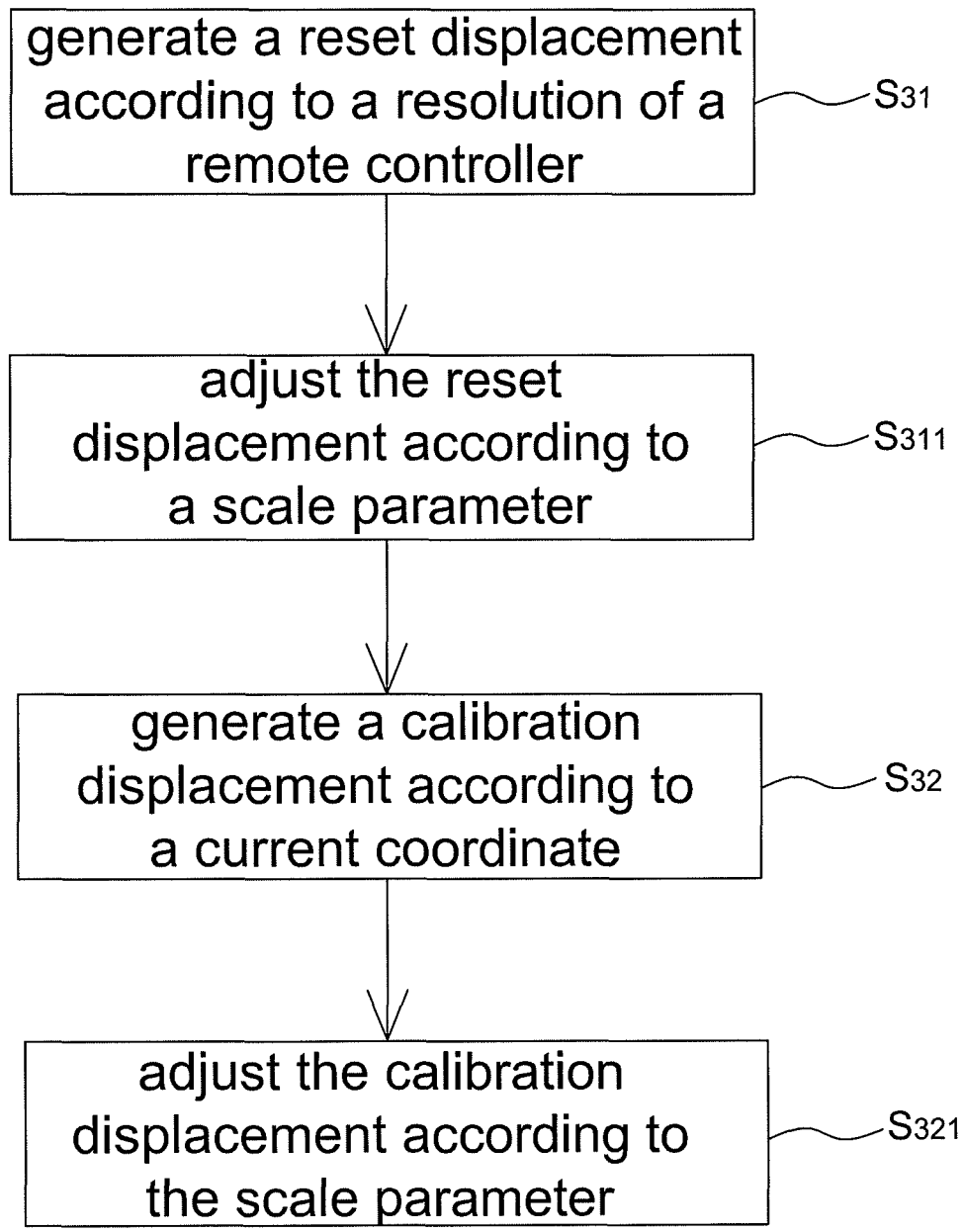
FIG. 11 shows an operational flow chart of the reset calibration mode of the interactive system according to the alternative embodiment of the present disclosure.

Referring to FIG. 11, it shows the operational flow chart of the reset calibration mode, which includes the steps of: generating a reset displacement according to a resolution of a remote controller (Step $S_{31}$); adjusting the reset displacement according to a scale parameter (Step $S_{311}$); generating a calibration displacement according to a current coordinate (Step $S_{32}$); and adjusting the calibration displacement according to the scale parameter (Step $S_{321}$). The difference between this embodiment and FIG. 7 is that in this embodiment the reset displacement and the calibration displacement are adjusted by the dongle 400 using the scale parameter at first and then outputted to the STB 300, and the STB 300 does not perform any scale adjustment. Other parts are similar to FIG. 7 and thus details thereof are not repeated herein.

Figure 12:
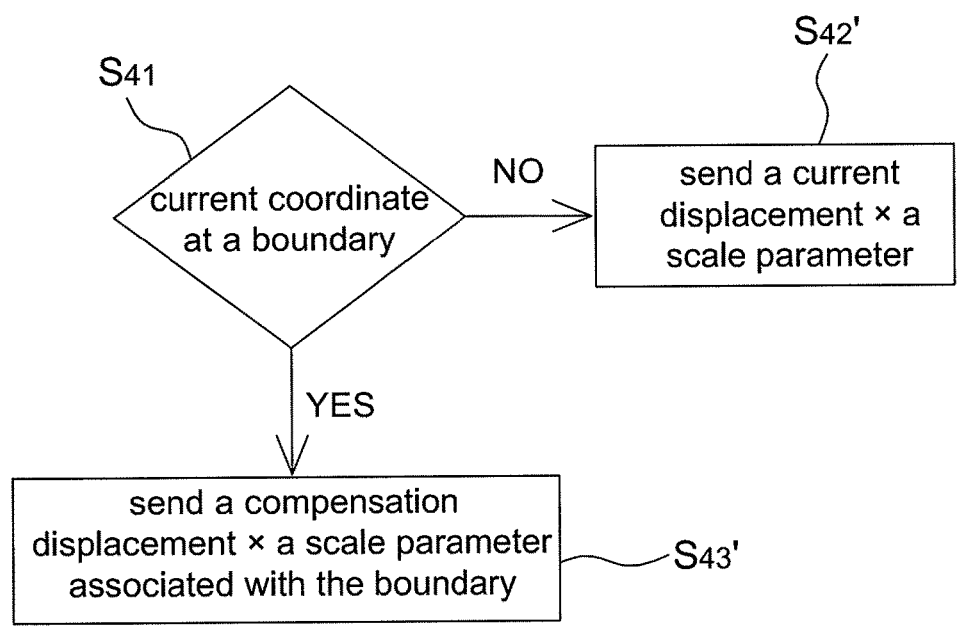
FIG. 12 shows an operational flow chart of the operation calibration mode of the interactive system according to the alternative embodiment of the present disclosure.

Referring to FIG. 12, it shows an operational flow chart of the operation calibration mode, which include the steps of: detecting whether a current coordinate is at a boundary (Step $S_{41}$); if not, generating a current displacement×a scale parameter (Step $S_{42}$'); if yes, generating a compensation displacement×a scale parameter associated with the boundary (Step $S_{43}$'). Similarly, the difference between this embodiment and FIG. 8 is that in this embodiment the current displacement and the compensation displacement are adjusted by the dongle 400 using the scale parameter at first and then outputted to the STB 300, and the STB 300 does not perform any scale adjustment. Other parts are similar to FIG. 8 and thus details thereof are not repeated herein.

It is appreciated that the dongle 400 may further include a memory unit 401 configured to store related parameters in calculating the displacement and identifying the boundary, e.g. including the scale parameter O of an image resolution of the image 120 with respect to a screen resolution of the screen 201 and/or a predetermined reset displacement, wherein the predetermined reset displacement may be determined according to an image resolution of the image 120 (or the screen resolution of the screen 201), e.g. (−1920, −1080) mentioned above. In other words, the reset displacement in FIGS. 7 and 11 may use the predetermined reset displacement saved in the memory unit 401.

In addition, although one reference beacon 210 is shown to be disposed on the display 200 in FIGS. 6 and 10, the present disclosure is not limited thereto. The reference beacon may also be integrated with the STB 300 or the dongle 400, or may be formed as an independent device for being placed close to the display 200, the STB 300 or the dingle 400. As the interactive system now includes only one reference beacon 210, the remote controller 100 may further include a sensor configured to sense a rotation angle of the remote controller 100.

Figure 13:
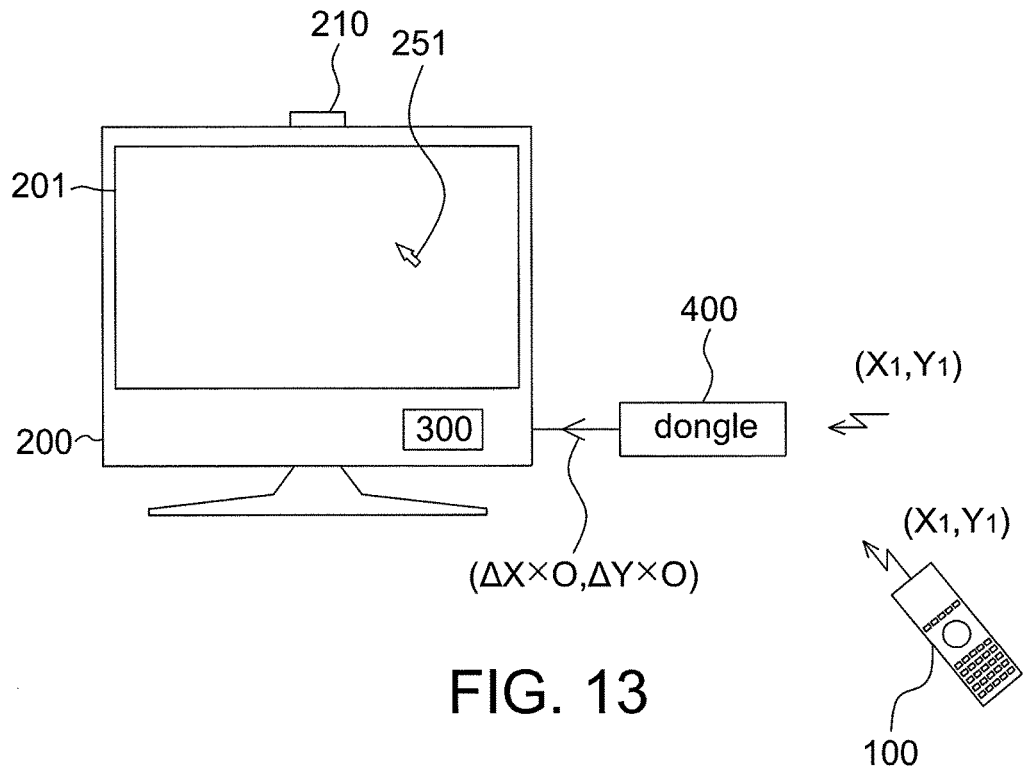
FIGS. 13-14 respectively show a schematic diagram of the interactive system according to an alternative embodiment of the present disclosure.
Figure 14:
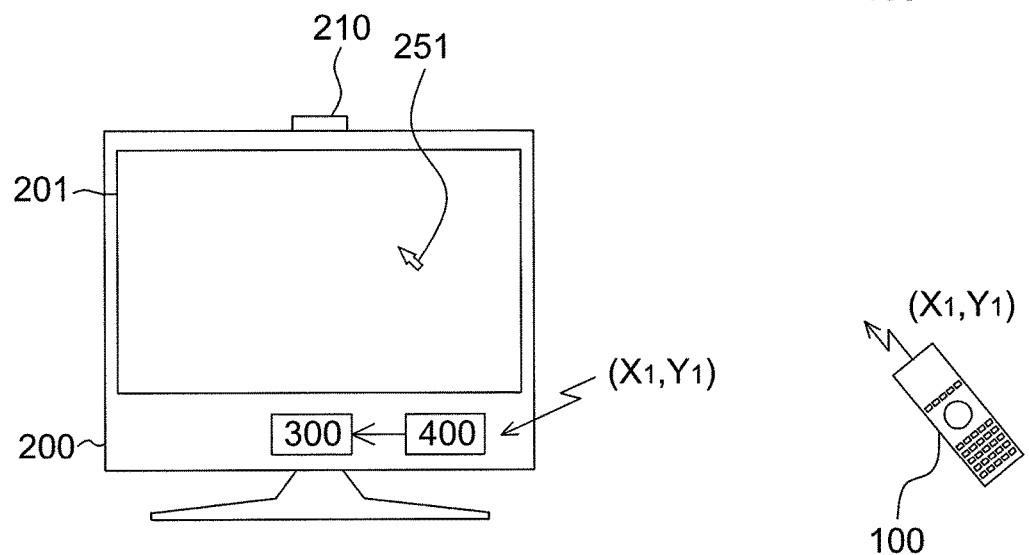

In addition, although the STB 300 and dongle 400 are shown to be disposed outside the display 200 in FIGS. 6 and 10, the present disclosure is not limited thereto. The STB 300 and/or the dongle 400 may also be integrated in the display 200 as shown in FIGS. 13 and 14. For example in FIG. 13, the STB 300 is shown to be integrated in the display 200, and when the STB 300 has the function of scaling, the dongle 400 outputs the displacement, reset displacement and calibration displacement so as to move the cursor 251 on the screen 201; and when the STB 300 does not have the function of scaling, the dongle 400 outputs the scale-adjusted displacement, reset displacement and calibration displacement so as to move the cursor 251 on the screen 201. For example in FIG. 14, the remote controller 100 only outputs the aiming coordinate (i.e. the absolute coordinate), and the displacement, reset displacement and calibration displacement are all calculated by the display 200.

It should be noted that the calculation of the corresponding values in every embodiment of the present disclosure may be directly implemented in the processing unit 140, and the descriptions disclosed in every embodiment of the present disclosure are only exemplary but not to limit the present disclosure.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An interactive system, configured to be operated by a user to control a cursor on a screen, the interactive system comprising:
    a display configured to show the screen and the cursor which has an initial position on the screen; and
    a processor configured to receive position information to control a position of the cursor on the screen, wherein upon receiving a first position information corresponding to an initial aiming coordinate of the cursor aimed by the user on the screen, the initial aiming coordinate not mapped to the initial position of the cursor, the processor is configured to
    calculate, according to the first position information, a relative distance associated with the initial aiming coordinate,
    reset the cursor, without using the initial aiming coordinate, from the initial position to a predetermined position, and then
    move the cursor, according to the relative distance, from the predetermined position to a correct position on the screen mapped to the initial aiming coordinate, such that the cursor on the screen is shown to be moved from the initial position not mapped to the initial aiming coordinate to the predetermined position, and then to the correct position mapped to the initial aiming coordinate.

2. The interactive system as claimed in claim 1, wherein the predetermined position is a corner of the screen.

3. The interactive system as claimed in claim 2, wherein the processor is configured to reset the cursor to the predetermined position by a screen resolution of the screen.

4. The interactive system as claimed in claim 1, wherein the position information and the first position information include imaging positions in a captured image captured by an image sensor of a remote controller.

5. The interactive system as claimed in claim 4, wherein the processor is further configured to confirm whether the initial aiming coordinate is at a boundary of the captured image.

6. The interactive system as claimed in claim 5, wherein when the initial aiming coordinate is at the boundary of the captured image, the processor is further configured to output a compensation displacement to move the cursor to a screen boundary of the screen, no matter what the initial position of the cursor is on the screen, associated with the boundary of the captured image.

7. The interactive system as claimed in claim 1, wherein the processor is further configured to perform a scaling on the relative distance according to a scale parameter which is a scale ratio of an image resolution of a captured image with respect to a screen resolution of the screen.

8. A remote device, configured to be operated by a user to control a cursor which has an initial position on a screen of a display, the remote device comprising:
    a processor configured to calculate a relative distance associated with an initial aiming coordinate aimed by the user, wherein the remote device is configured to
    output a predetermined reset displacement, which is configured to move the cursor from the initial position to a predetermined position on the screen without using the initial aiming coordinate aimed by the user, to the display before outputting the relative distance to the display, and
    then output the relative distance, which is configured to move the cursor from the predetermined position to a correct position on the screen mapped to the initial aiming coordinate aimed by the user, to the display, such that the cursor on the screen is shown to be moved from the initial position not mapped to the initial aiming coordinate to the predetermined position, and then to the correct position mapped to the initial aiming coordinate.

9. The remote device as claimed in claim 8, wherein the predetermined position is a corner of the screen.

10. The remote device as claimed in claim 9, wherein the cursor is moved from the initial position to the predetermined position on the screen by a screen resolution of the screen.

11. The remote device as claimed in claim 8, wherein the processor is further configured to perform a scaling on the relative distance according to a scale parameter which is a scale ratio of an image resolution of a captured image with respect to a screen resolution of the screen.

12. The remote device as claimed in claim 11, further comprising an image sensor configured to capture the captured image.

13. The remote device as claimed in claim 12, wherein the processor is configured to calculate the initial aiming coordinate according to imaging positions in the captured image.

14. The interactive system as claimed in claim 4, wherein the relative distance is a distance between an origin of the captured image and an aiming position of the initial aiming coordinate in the captured image.

* * * * *